United States Patent [19]

Sugimoto et al.

[11] 4,289,373
[45] Sep. 15, 1981

[54] BIDIRECTIONAL OPTICAL FIBER TRANSMISSION SYSTEM

[75] Inventors: Shigetoki Sugimoto; Kouichi Minemura, both of Tokyo, Japan

[73] Assignee: Nippon Electric Co., Ltd., Tokyo, Japan

[21] Appl. No.: 65,223

[22] Filed: Aug. 9, 1979

[30] Foreign Application Priority Data

Jul. 6, 1979 [JP] Japan .................... 54-86238

[51] Int. Cl.³ .............................. G02B 5/14
[52] U.S. Cl. .................................. 350/96.16
[58] Field of Search ............... 350/96.15, 96.16, 96.18

[56] References Cited

PUBLICATIONS

Minemura et al., "Two-way Transmission Experiments Over a Single Optical Fibre at the Same Wavelength Using Micro-Optic 3dB Couplers", in Electronics Letts., vol. 14, No. 11, May 1978, pp. 340-342.

Usui et al., "Three-way Optical Directional Coupler", article Nippon Electric Company Ltd., Mar. 1978.
Kobayashi et al., "Micro Optics Devices for Branching, Coupling, Multiplexing", from *Int. Conf. on Integrated & Optical Fiber Comm.*, 1977, paper B11-3.

*Primary Examiner*—Stewart J. Levy
*Attorney, Agent, or Firm*—Hopgood, Calimafde, Kalil, Blaustein & Judlowe

[57] ABSTRACT

There is disclosed a bidirectional optical fiber transmission system. This system includes first and second light transmitter-receiver sets and a single strand of optical fibers. The light transmitter-receiver sets each comprise (a) a light receiver, (b) a light transmitter whose light source is a light emitting diode, and (c) means to isolate downstream and upstream light from each other. The optical fibers connect the light-transmitter-receiver sets through the light isolating means. The emission spectra of the light emitting diodes at least partly overlap each other and the isolating means have wavelength pass bands which do not substantially overlap each other.

6 Claims, 8 Drawing Figures

BIDIRECTIONAL OPTICAL FIBER TRANSMISSION SYSTEM

BACKGROUND OF THE INVENTION

1. Field of the Invention

This invention relates to optical fiber communication systems. More particularly, this invention relates to an improvement in bidirectional optical fiber transmission systems.

2. Description of the Prior Art

Optical fiber transmission systems, which have many remarkable advantages over conventional transmission systems, are expected to prove useful in a wide range of applications from long-distance, large-capacity to short-range, small-capacity transmission. Efforts are being made across the world to develop such systems of superior performance.

One such bidirectional optical fiber transmission system which has been proposed uses a single strand of optical fiber with a pair of transmitter-receiver sets, primarily comprising a light emitting diode and a photodiode, respectively, coupled to each end of the fiber through an optical directional 3 dB coupler. This system is capable of full two-way communication employing light of the same emission spectrum (See, "Full Duplex Transmission Link over Single-strand Optical Fiber", by B. S. Kawasaki et al., at 1 Optics Letters at 107–08 (1977), and "Two-way Transmission Experiments over a Single Optical Fiber at the Same Wavelength Using Micro-optic 3 dB Couplers", by K. Minemura et al, at 14 Electronics Letters, at 340–42 (1978). This system which uses the same optical wavelength, is attractive both with respect to reliability and producibility of the optical devices compared with those which use different optical wavelengths.

However, as pointed out in both of the above-identified literature articles, part of the optical signal transmitted from the light emitting diode of one transmitter-receiver set to the other set reaches the photodiode of the same set, owing to internal reflections in and leakage from such optical elements as optical connectors or couplers, reflections from joints between the optical fiber and optical elements, and reflections from the splices of the optical fiber itself. There results a limitation in either the sensitivity of light received or the transmission distance. Such limitations cause design, construction, and implementation to be quite difficult.

OBJECTS AND SUMMARY OF THE INVENTION

Accordingly, it is an object of the present invention to provide a bidirectional optical fiber transmission system which results in improved sensitivity of light reception and increased transmission distance.

The present invention provides a bidirectional optical fiber transmission system which includes as its components first and second light transmitter-receiver sets. These sets each primarily comprise (a) a light receiver, (b) a light transmitter whose light source is a light emitting diode, and (c) means to isolate downstream light and upstream light from each other. The optical fiber transmission system also contains a single strand of optical fiber which connects these light transmitter-receiver sets through the light isolating means. The emission spectra of the light emitting diodes at least partly overlap each other and the isolating means have wavelength pass bands which do not substantially overlap each other.

Although, in this invention, each transmitter utilizes only the long-wavelength or short-wavelength content of the emission spectrum of its light emitting diode by using filtering means, the sensitvity of reception can be improved because the attenuation of near-end leakage to each receiver is substantially increased.

DETAILED DESCRIPION OF THE PREFERRED EMBODIMENTS

Figure 1:
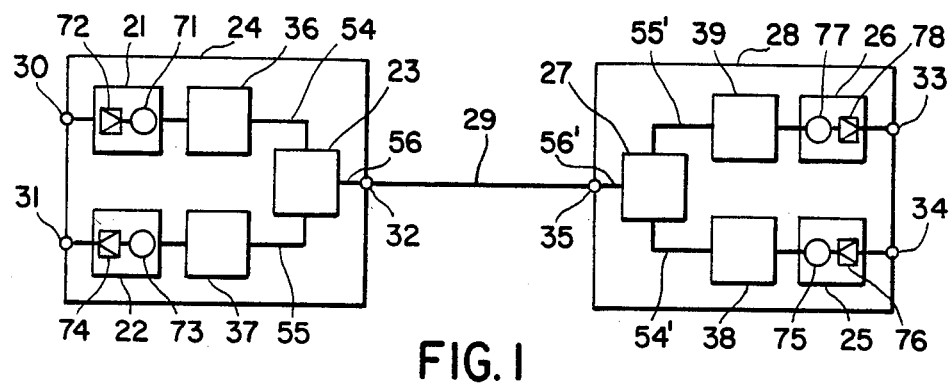
FIG. 1 is a block diagram of an embodiment of the bidirectional light transmission of this invention.

In FIG. 1, a first transmitter-receiver set 24 includes transmitter 21 which is composed of driving amplifier 72 and light emitting diode 71, and receiver 22 which consists of photodiode 73 and receiving amplifier 74. Transmitter 21 and receiver 22 are coupled to 3 dB optical directional coupler 23 through short-wavelength pass filter (SWPF) 36 and long-wavelength pass filter (LWPF) 37, respectively. Similarly, transmitter 25 and receiver 26 of second transmitter-receiver set 28 are coupled to another 3 dB directional coupler 27 through another LWPF 38 and another SWPF 39, respectively. Second transmitter-receiver set 28 is similar to first transmitter-receiver set 24 in that its transmitter 25 involves light emitting diode 75 and a driving amplifier 76 and its receiver 26 includes photodiode 77 and receiving amplifier 78. The first and second transmitter-receiver sets are connected to each other through optical connector 32, optical fiber transmission path 29 and another optical connector 35.

Figure 2:
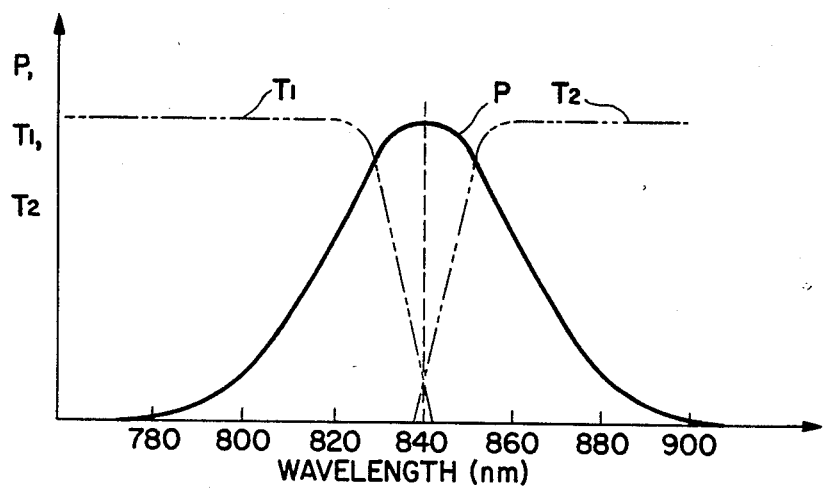
FIG. 2 is a graph indicating the emission spectrum of the light emitting diodes and the characteristics of a short-wavelength pass optical filter and a long-wavelength pass optical filter.
Figure 3:
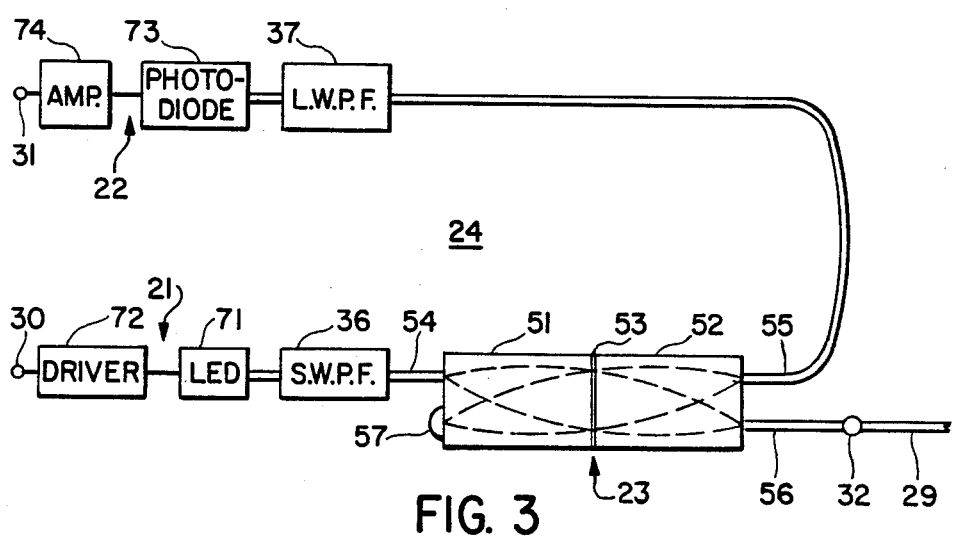
FIG. 3 is a block diagram of the light transmitter-receiver set 24 in FIG. 1.

When FIGS. 2 and 3 are viewed in conjunction with FIG. 1, there may be seen CaAlAs light emitting diode 71, operated by an electric signal fed to terminal 30, emitting an emission spectrum P having a central wavelength of 840 nm and a full width at half maximum (FWHM) of 45 nm. A light beam below 840 nm in central wavelength having passed the SWPF 36 which has a characteristic $T_1$ to transmit short wavelengths and reflect long wavelengths, with 840 nm as border point, passes optical fiber 54, enters a 3 dB coupler 23, in which the beam undergoes 3 dB attenuation, and further enters the step-index optical fiber transmission path 29 having a core diameter of 100 μm, external fiber diameter of 150 μm, and N.A. (numerical aperture) of 0.25. A light beam coming into the second transmitter-receiver set 28 after undergoing 3 dB attenuation in another 3 dB coupler 27, passes the other SWPF 39 having the same pass characteristic $T_1$, and the Si-photodiode 77 receives a light beam below 840 nm in wavelength. This light beam is converted into an electric signal and turned out of a terminal 33 as output signal.

On the other hand, light emitting diode 75 of second transmitter-receiver set 28 is made of the same material, GaAlAs, and has the same light emitting characteristic as light emitting diode 71 of first transmitter-receiver set 24. Out of the spectrum P of light emitting diode 75, because of the presence of the LWPF which has a characteristic $T_2$ to transmit long wavelengths and reflect short wavelengths, with 840 nm as border point, only that component of light which is longer than 840 nm in wavelengths enters the 3 dB coupler 27, in which the light beam undergoes 3 dB attenuation and is transmitted to step-index optical fiber transmission path 29.

The light beam further enters 3 dB coupler 23, in which it undergoes 3 dB attenuation again, and then goes into the LWPF 37 having the characteristic $T_2$. Therefore, light beams above 840 nm in wavelength enter photodiode 73 and are turned out as output electric signals from another terminal 31.

Each of the LWPFs 37 and 38 and the SWPFs 36 and 39 used herein has a transmissivity of about 90 percent and a reflectivity of about 10 percent in its maximum transmission range, or a transmissivity of about 10 percent and a reflectivity of about 90 percent, and can be readily realized by the use of a multi-layered dielectric film.

Directional coupler 23, as illustrated in FIG. 3, is an integrated structure consisting of two cylindrical light focusing transmission bodies 51 and 52, each as long as about a quarter of the pitch, and translucent mirror 53 which has no spectral characteristic in the wavelength band where it is used and is interposed between the two light focusing transmission bodies. It is well known that a light focusing transmission body has a refractive index distribution wherein the index gradually decreases, on a sectional plane normal to the central axis thereof, with the distance from the central axis and that light beam undulatingly propagates therein at a specified pitch. (Such a directional coupler is described in detail in "Micro-optics Devices for Branching, Coupling, Multiplexing and Demultiplexing", by K. Kobayashi et al., at 1977 INTERNATIONAL CONFERENCE ON INTEGRATED OPTICS AND OPTICAL FIBER COMMUNICATION, Technical Digest, July 18-20, 1977, Tokyo, Japan.) To directional coupler 23 is connected three input/output optical fibers 54 through 56 and a terminal unit 57 made of a light-absorptive material.

The light entering from the optical fiber 54 into the directional coupler 23 is, after undergoing 3 dB attenuation as described above, divided into two components, one being transmitted through translucent mirror 53 to optical fiber transmission path 29 and the other reflected by translucent mirror 53 towards terminal unit 57. The former, apart from being detected by second receiver 26, is partly reflected by the adjoining end faces of directional coupler 23 and optical fiber 56 or by optical connector 32 and 35 and travels in the reverse direction. While these unnecessary reflected components of the light are again reflected by translucent mirror 53 and proceed by way of optical fiber 55 to first receiver 22, they are almost thoroughly attenuated by the LWPF 37, resulting in an increase in so-called near-end leakage attenuation. On the other hand, the long-wavelength light beam above 840 nm supplied from second transmitter 25 enters coupler 23 by way of optical fibers 29 and 56, and undergoes 3 dB attenuation by translucent mirror 53, and its reflected component travels via optical fiber 55 and LWPF 37, and is detected by photodiode 73. Thus, only the component of the light spectrum which is transmitted from second transmitter 25 enters photodiode 73 of first receiver 22, and the light spectrum from first transmitter 21 is eliminated, resulting in an improved receiver sensitivity.

Figure 4:
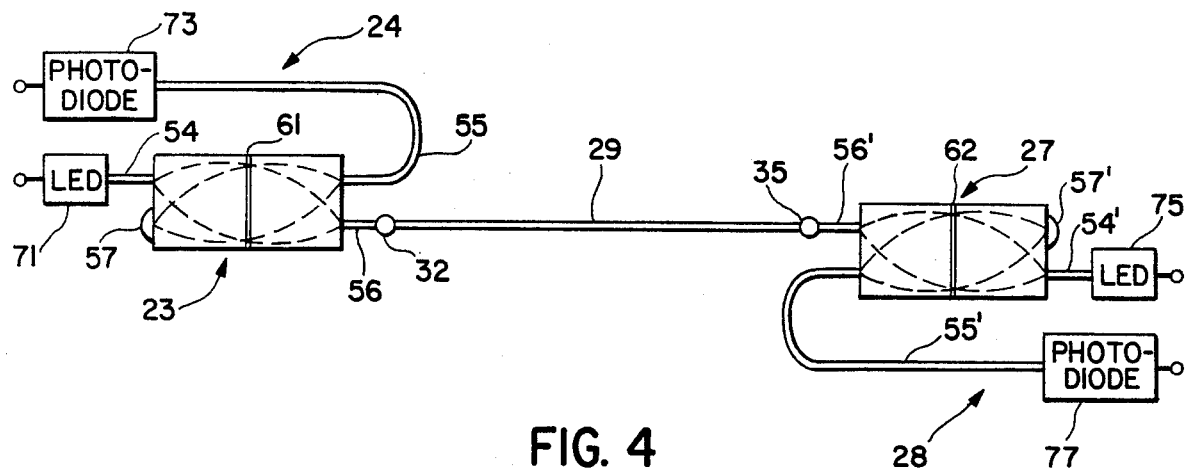
FIGS. 4 through 7 are block diagrams, each illustrating a particular embodiment of the bidirectional optical fiber transmission system of this invention.

In FIG. 4, first transmitter-receiver set 24 consists of a transmitter having GaAlAs light emitting diode 71 which emits a spectrum of 840 nm in central wavelength and 45 nm in the FWHM and a receiver having an Si-photodiode 73. Light emitting diode 71 and photodiode 73 are connected to first light divider 23 via optical fibers 54 and 55, respectively. Second transmitter-receiver set 28 involves another light emitting diode 75 which emits the same spectrum P as first light emitting diode 71 and another Si-photodiode 77, both connected to optical fiber transmission path 29 through second light divider 27. Light dividers 23 and 27 to be used in this embodiment are structured in substantially the same way as the directional couplers described with reference to FIG. 3. The only difference between them is the use of a multi-layered film having a filtering characteristic in place of the translucent mirror 53. Multi-layered film 61 of first divider 23 has the same short-wavelength pass and long-wavelength reflect characteristic $T_1$ as what was described with reference to FIG. 2. On the other hand, multi-layered film 62 of second divider 27 has the short-wavelength reflect and long-wavelength pass characteristic $T_2$. When a light signal of 840 nm in central wavelength emitted by first light emitting diode 71 enters first divider 23, the component of light shorter than 840 nm in wavelength passes the multi-layered film 61, travels through optical fiber 56, light connector 32, optical fiber transmission path 29, another light connector 35 and another optical fiber 56', and enters second light divider 27. Because multi-layered film 62 of light divider 27, as stated above, has the characteristic $T_2$, any light from first transmitter-reveiver set 24 consisting of shorter wavelength components than 840 nm is reflected thereby and detected by photodiode 77. In this embodiment, therefore, any light once entering divider 27 from optical fiber transmission path 29 merely undergoes 10-percent attenuation before it reaches photodiode 77.

Again with regard to first transmitter-receiver set 24, the component of light reflected by multi-layered film 61 towards photodiode 73 is negligibly small, because, out of the light passing multi-layered film 61, nearly all the components reflected by the joint between first divider 23 and optical fiber 56, or by light connectors 32 or 35 pass multi-layered film 61 and return towards light emitting diode 36. On the other hand, the light having a wavelength above 840 nm, which enters divider 23 from light emitting diode 71 and is reflected by multi-layered film 61 is absorbed in terminal unit 57. The light having a wavelength of 840 nm or longer, which enters second light divider 27 from light emitting diode 75 passes multi-layered film 62, propagates towards first tran mitter-receiver set 24, and is received by photodiode 73. The component of light having a wavelength below 840 nm is reflected by multi-layered film 62 and almost wholly absorbed in another terminal unit 57'.

Accordingly, in this embodiment wherein only the long wavelength side or the short wavelength side of the spectrum of a light emitting diode is transmitted, there is no substantial attenuation in any divider in the receiving phase, although there is an approximately 3 dB spectral attenuation in the transmitting phase. The sensitivity of reception is further improved because the entrance of light from the light emitting diode to the photodiode in the same transmitter-receiver set can be effectively eliminated.

Figure 5:
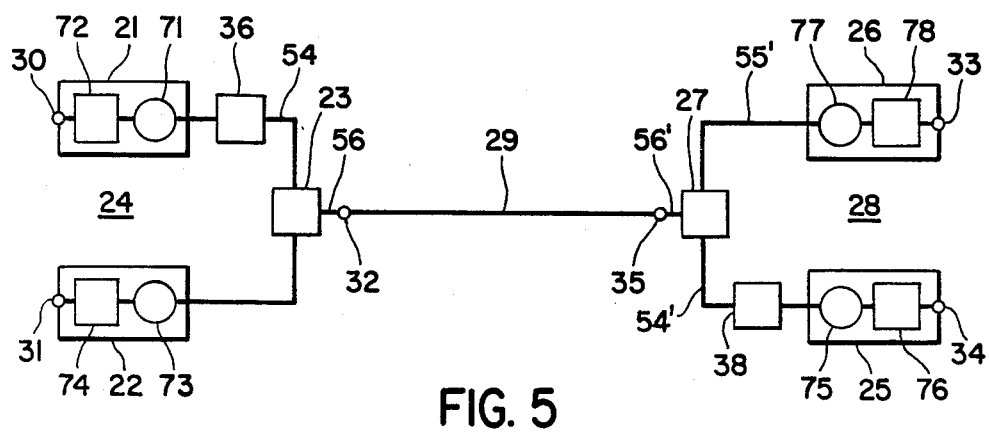

The embodiment illustrated in FIG. 5 differs from that in FIG. 4 in that an SWPF 36 having the characteristic $T_1$ is inserted between light emitting diode 71 and the earlier cited paper by K. Minemura et al. and those of the embodiments hereof are listed in Table 1. Accordingly, where an optical fiber transmission path of about 5 dB/km is used, the distance between the first and second transmitter-receiver sets is approximately 5 kilometers in the embodiment illustrated in FIG. 7, in contrast to the conventional system where the corresponding distance is at most only about 3 kilometers.

TABLE 1

Figure 6:
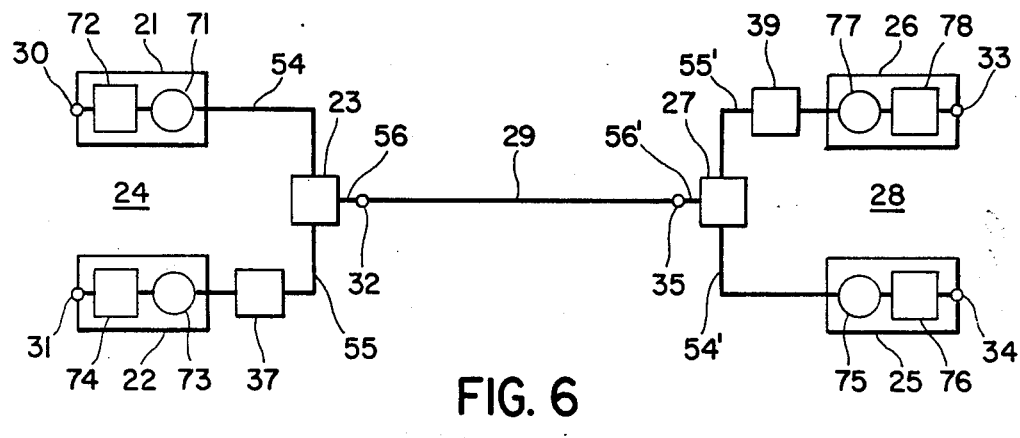
Figure 7:
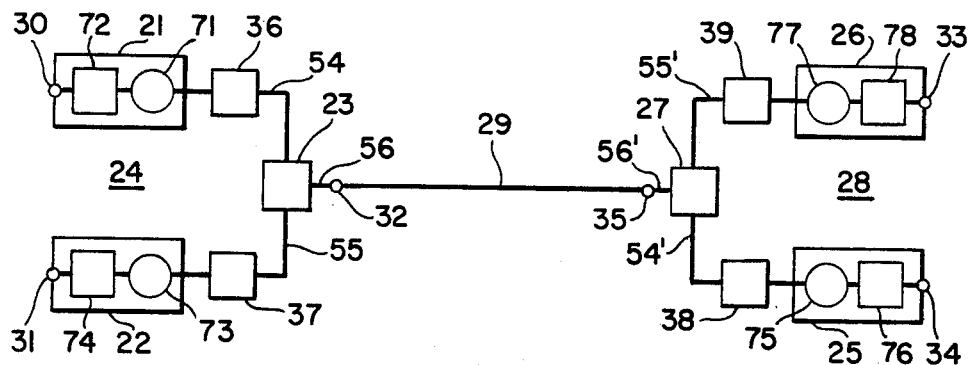

| | Near-end leakage attenuation (dB) | Leakage (dBm) | Insertion loss per pair of separating means (dB) | Sensitivity of light reception (Pe = 1 × 10$^{-9}$) (dBm) | Permissible loss on transmission path (dB) | Improvement (dB) |
|---|---|---|---|---|---|---|
| 1. Minemura et al. | 22 | −27 | 7.5 | −26.9 | 14.4 | — |
| 2. FIG. 1 | 35 | −40 | 14.5 | −37.6 | 18.1 | 3.7 |
| 3. FIG. 4 | 27 | −32 | 7.0 | −32.5 | 20.5 | 6.1 |
| 4. FIG. 5 | 35 | −40 | 9.5 | −37.6 | 23.1 | 8.7 |
| 5. FIG. 6 | 35 | −40 | 9.5 | −37.6 | 23.1 | 8.7 |
| 6. FIG. 7 | 43 | −48 | 12.0 | −41.0 | 24.0 | 9.6 | first divider 23 and that LWPF 38 having the characteristic $T_2$ is inserted between another light emitting diode 75 and second divider 27. SWPF 36 has similar transmitting and reflecting characteristics as the multi-layered film of first divider 23. LWPF 38 has similar characteristics as the multi-layered film of second divider 27. Thus a divider having similar characteristics as first divider 23 and another having similar characteristics as second divider 27 are used as optical filters 36 and 38, respectively. In this embodiment, since the output light beam of each of light emitting diodes 71 and 75 which emit the same spectrum passes two filters having the same characteristics before it reaches the optical fiber transmission path 29, the near-end leakage attenuation is approximately 35 dB, about 8 dB greater than in the embodiment illustrated in FIG. 4. Although the insertion of the optical filters 36 and 38 entails an additional insertion loss of about 2 dB, respectively, the sensitivity of light reception is improved by approximately 10 dB owing to the amelioration of the near-end leakage attenuation, resulting in a net improvement of about 8 dB in level margin.

The embodiment illustrated in FIG. 6 differs from that in FIG. 4 in that an LWPF 37 is inserted between a photodiode 73 and first divider 23, and SWPF 39 is between another photodiode 77 and second divider 27. LWPF 37 and the SWPF 39 have similar characteristics as dividers 27 and 23, respectively. In this instance, too, near-end leakage attenuation is improved, resulting in a similar effect to that of the embodiment illustrated in FIG. 5.

In the embodiment illustrated in FIG. 7, which is a combination of those in FIGS. 5 and 6, SWPF 36 is inserted between light emitting diode 71 and first divider 23, and LWPF 37 is between photodiode 73 and first divider 23. Similarly, another LWPF 38 is inserted between another light emitting diode 75 and second divider 27, and another SWPF 39 is between another photodiode 77 and second divider 27. In this embodiment, further improvement by 1 dB is achieved, as compared with those in FIGS. 5 and 6.

Figure 8:
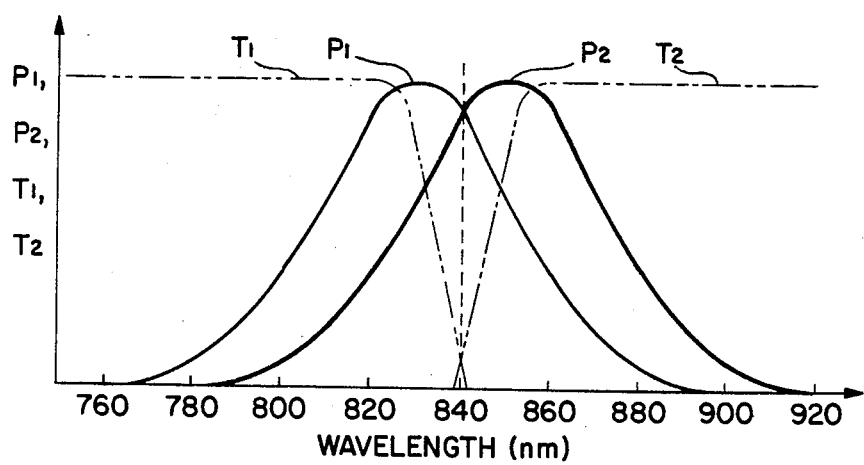
FIG. 8 is a graph indicating the emission spectra of two different kinds of light emitting diodes and the characteristics of another short-wavelength pass optical filter and another long-wavelength pass optical filter.

When a light pulse of 6.3 Mbits and −5 dBm is transmitted from a transmitter, the peak sensitivity of light reception, if the pulse is received at a code error rate of $1 \times 10^{-9}$, will be −42 dBm, assuming the absence of leakage. Because leakage actually does occur as explained above, the sensitivity of light reception will be much lower. Differences between the values given in Although, in the above described embodiments, light-emitting diodes 71 and 75 in the matched pair of transmitter-receiver sets have substantially the same central wavelengths of emission and emission spectra, they would still serve their purpose even though they differed somewhat from each other in the two respects, only if the two spectra partly overlap each other. Thus, if a light emitting diode having an emission spectrum $P_1$ of 830 nm in central wavelength and 43 nm in FWHM is used in the first transmitter, another light emitting diode having an emission spectrum $P_2$ of 850 nm in central wavelength and 45 nm in FWHM as shown in FIG. 8 is used in the second transmitter, and optical filters having the same $T_1$ and $T_2$ characteristics as those in the above described embodiments are used, the part of the spectrum cut by each filter will be reduced to substantially decrease the insertion loss, resulting in further improvement in the performance of the system.

It is also apparent that, unlike the above described embodiments in which short wavelength pass and long wavelength pass optical filters are used, band pass filters having different pass bands can also be used with equally desirable effects. Similarly, the combination of a band pass filter and a short wavelength pass or long-wavelength pass optical filter may be employed in FIGS. 5 to 7.

Also, the light dividers need not be the type used in the above described embodiments, but maybe be diffraction gratings, prisms, colored glass filters or ordinary multi-layered film filters. The coupler used in FIG. 1 is not restricted to 3 dB coupling and may be the coupler described in the earlier cited paper by B. S. Kawasaki et al.

We claim:

1. A bidirectional optical fiber transmission system comprising
  a first transmitter-receiver set comprising of a firsst light receiving means, a first light transmitting means which has a first light emitting diode as light source, and a first downstream-upstream dividing means which has a short wavelength pass filtering means to filter the part of the spectrum, emitted by said first light emitting diode, shorter in wavelength than a prescribed value and another filtering means to pass the light to be received, and separates the light to be transmitted and that to be received;

a second transmitter-receiver set comprising of a second light receiving means, a second light transmitting means which has, as light source, a second light emitting diode whose emission spectrum at least partly overlaps that of said first light emitting diode, and a second downstream-upstream dividing means which has a long wavelength pass filtering means to filter the part of the spectrum, emitted by said second light emitting diode, longer in wavelength than the prescribed value and another filtering means to pass the light to be received, and separates the light to be transmitted and that to be received, and an optical fiber transmission path to connect said first and second transmitter-receiver sets.

2. The bidirectional optical fiber transmission system of claim 1, wherein each of said first and second downstream-upstream dividing means comprises two light focusing transmission bodies in which the refraction index, on a plane normal to the central axis thereof, gradually decreases from the center towards the periphery and whose length is approximately equal to a quarter of the pitch at which light beams propagate undulatingly therein, and a wavelength-dependent multi-layered dielectric film interposed between said light focusing transmission bodies.

3. The bidirectional optical fiber transmission system of claim 2, wherein the multi-layered dielectric film of said first downstream-upstream dividing means passes said short wavelengths and reflects light in the wavelength range of said long wavelength pass function, and that said second downstream-upstream dividing means reflects light in the wavelength range of said short wavelength pass function and passes said long wavelengths.

4. The bidirectional optical fiber transmission system of claim 3, wherein filtering means having similar characteristics as said short wavelength pass characteristic is additionally arranged between said first downstream-upstream dividing means and said first light emitting diode, and filtering means having similar characteristics as said long wavelength pass characteristic is additionally arranged between said second downstream-upstream dividing means and said second light emitting diode.

5. The bidirectional optical fiber transmission system of claim 3 or 4, wherein filtering means having similar characteristics as said long wavelength pass characteristic is arranged between said first downstream-upstream dividing means and said first receiving means, and filtering means having similar characteristics as said short wavelength pass characteristic is arranged between said second downstream-upstream dividing means and said second receiving means.

6. The bidirectional optical fiber transmission system of claim 1, wherein said first and second downstream-upstream dividing means contain optical directional couplers which further include as their components light focusing transmission bodies in which the refraction index, on a plane normal to the central axis thereof, gradually decreases from the center towards the periphery and whose length is approximately equal to a quarter of the pitch at which light beams propagate undulatingly therein, and translucent mirrors arranged between them, which are not wavelength-dependent in the spectrum range in which they are used.

* * * * *

UNITED STATES PATENT AND TRADEMARK OFFICE
CERTIFICATE OF CORRECTION

PATENT NO. : 4,289,373
DATED : September 15, 1981
INVENTOR(S) : Shigetoki Sugimoto; Kouichi Minemura It is certified that error appears in the above-identified patent and that said Letters Patent are hereby corrected as shown below:

On the front page of the patent, under "Foreign Application Priority Data" please insert:

Aug. 17, 1978 [JP] Japan......53-100742

Signed and Sealed this

Twelfth Day of January 1982

[SEAL]

Attest:

GERALD J. MOSSINGHOFF

Attesting Officer     Commissioner of Patents and Trademarks